(12) United States Patent
Ben-Hamida et al.

(10) Patent No.: US 8,606,621 B2
(45) Date of Patent: Dec. 10, 2013

(54) CARBON MANAGEMENT FOR SOURCING AND LOGISTICS

(75) Inventors: Mondher Ben-Hamida, Chicago, IL (US); Chad Boucher, Concord, NC (US); Paolina Centonze, Amawalk, NY (US); Mary E. Helander, North White Plains, NY (US); Kaan K. Katircioglu, Yorktown Heights, NY (US); Karthik Sourirajan, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/618,320

(22) Filed: Sep. 14, 2012

(65) Prior Publication Data

US 2013/0013367 A1    Jan. 10, 2013

Related U.S. Application Data

(63) Continuation of application No. 12/323,775, filed on Nov. 26, 2008, now Pat. No. 8,346,595.

(51) Int. Cl.
*G06Q 40/00* (2012.01)
*G06Q 10/00* (2012.01)
*G06F 17/00* (2006.01)

(52) U.S. Cl.
USPC ......... 705/7.35; 705/400; 705/7.37; 705/7.11

(58) Field of Classification Search
USPC ............. 705/7.37, 7.36, 7.11, 7.23, 7.24, 1.1, 705/330, 334, 335, 337, 338, 400
See application file for complete search history.

(56) References Cited

U.S. PATENT DOCUMENTS

| | | | |
|---|---|---|---|
| 5,953,707 | A | 9/1999 | Huang et al. |
| 2004/0158478 | A1 | 8/2004 | Zimmerman |
| 2004/0193470 | A1 | 9/2004 | Nemoto et al. |
| 2005/0273358 | A1 | 12/2005 | Zimmerman |
| 2006/0089851 | A1 | 4/2006 | Silby et al. |
| 2006/0242099 | A1 | 10/2006 | Chen et al. |
| 2007/0094216 | A1 | 4/2007 | Mathias et al. |
| 2007/0255457 | A1 | 11/2007 | Whitcomb et al. |
| 2008/0040182 | A1 | 2/2008 | Wegner et al. |
| 2009/0177505 | A1 | 7/2009 | Dietrich et al. |
| 2009/0292617 | A1 | 11/2009 | Sperling et al. |

OTHER PUBLICATIONS

"Carbon Footprint" from Wikipedia, pp. 1-8.
"Carbon Footprint, Reducing your impact", www.carbonfootprint.com/calculator.aspx, pp. 1-3.

*Primary Examiner* — Igor Borissov
(74) *Attorney, Agent, or Firm* — Scully, Scott, Murphy & Presser P.C.; Daniel P. Morris, Esq.

(57) ABSTRACT

Embodiments of the invention provide a method, system and computer program product for carbon management for sourcing and logistics. In one embodiment, the method comprises using a computer for quantifying both a cost and a carbon impact of one or more logistics policies relating to a manufacturing process; and minimizing the cost and carbon impact using a defined equation including a first component representing a transportation cost, and a second component representing a carbon cost. In an embodiment of the invention, the quantifying includes using an analytics engine to quantify the cost and carbon impact. The analytics engine may include a shipment analysis module to calculate an optimal transportation policy, a sourcing analysis module for testing alternate sourcing options, a scenario analysis module to find an optimal order frequency, and a sensitivity analysis module to test the impact of various changes.

25 Claims, 10 Drawing Sheets

ROAD DISTANCE CORRECTION FACTORS

| | | | | | | | | | |
|---|---|---|---|---|---|---|---|---|---|
| AB | AB | 1.600873 | AL | FL | 1.446806 | ID | KS | 1.403 |
| AB | AK | 1.3774 | AL | GA | 1.328029 | ID | KY | 1.243933 |
| AB | AL | 1.3774 | AL | IA | 1.2096 | ID | LA | 1.355967 |
| AB | AR | 1.3774 | AL | ID | 1.2837 | ID | MA | 1.3774 |
| AB | AZ | 1.3774 | AL | IL | 1.2787 | ID | MB | 1.3774 |
| AB | BC | 1.3774 | AL | IN | 1.4508 | ID | MD | 1.3774 |
| AB | CA | 1.3774 | AL | KS | 1.3205 | ID | ME | 1.3379 |
| AB | CO | 1.5359 | AL | KY | 1.3774 | ID | MI | 1.3505 |
| AB | CT | 1.3774 | AL | LA | 1.208125 | ID | MN | 1.265333 |
| AB | DC | 1.3774 | AL | MA | 1.1846 | ID | MO | 1.2207 |
| AB | DE | 1.3774 | AL | MB | 1.5727 | ID | MS | 1.31857 |
| AB | FL | 1.3774 | AL | MD | 1.3774 | ID | MT | 2.222781 |
| AB | GA | 1.3774 | AL | ME | 1.3774 | ID | MX | 1.4004479 |
| AB | IA | 1.3774 | AL | MI | 1.1571 | ID | NB | 1.4004479 |
| AB | ID | 1.3774 | AL | MN | 1.3347 | ID | NC | 1.250067 |
| AB | IL | 1.3774 | AL | MO | 1.33155 | ID | ND | 1.31705 |
| AB | IN | 1.2169 | AL | MS | 1.46935 | ID | NE | 1.2739 |
| AB | KS | 1.3774 | AL | MT | 1.31305 | ID | NH | 1.2352 |
| AB | KY | 1.3774 | AL | MX | 1.50772 | ID | NJ | 1.3774 |
| AB | LA | 1.3774 | AL | NB | 1.50772 | ID | NL | 1.43085 |
| AB | MA | 1.3774 | AL | NC | 1.174 | ID | NM | 1.328167 |
| AB | MB | 1.3774 | AL | ND | 1.297 | ID | NS | 1.3551 |
| AB | MD | 1.3774 | AL | NE | 1.3774 | ID | NT | 1.3774 |
| AB | ME | 1.3774 | AL | NH | 1.3774 | ID | NU | 1.3774 |
| AB | MI | 1.2169 | AL | NJ | 1.3774 | ID | NV | 1.876 |
| AB | MN | 1.3774 | AL | NL | 1.3774 | ID | NY | 1.2286 |
| AB | MO | 1.3774 | AL | NM | 1.1799 | ID | OH | 1.18105 |
| AB | MS | 1.3774 | AL | NS | 1.3774 | ID | OK | 1.4277 |
| AB | MT | 1.46822 | AL | NT | 1.3774 | ID | ON | 1.3099 |
| AB | MX | 1.46822 | AL | NU | 1.3774 | ID | OR | 2.164286 |
| AB | NB | 1.3774 | AL | NV | 1.3774 | ID | PA | 1.213025 |
| AB | NC | 1.3774 | AL | NY | 1.221033 | ID | PE | 1.3774 |

FIG. 4

| MODE TYPE | FIXED COST ($) | VARIABLE COST ($/TONMILE) |
|---|---|---|
| LTL | 70 | 0.30 |
| TL | 110 | 0.17 |
| PARCEL | 45 | 0.40 |
| GROUND EXPEDITE | 400 | 0.90 |
| FLATBED | 280 | 0.25 |
| AIR | 450 | 1.90 |

Sourcing Analysis

Outpost Sourcing Analysis Table

File

| Options | Option 1 | Option 2 | Option 3 | Option 4 |
|---|---|---|---|---|
| OptionName | Cross Dock Ship | Direct Ship | Truck Load Consolidation | Alternative Location |
| PartNumber | | | | |
| SupplierCode | PP91018 | PP91018 | PP91018 | PP91018 |
| SupplierCity | CHICAGO | CHICAGO | CHICAGO | CHARLOTTE |
| SupplierState | IL | IL | IL | NC |
| SupplierCountry | US | US | US | US |
| CrossDockCity | COLUMBUS | | | |
| CrossDockState | IN | | | |
| CrossDockCountry | US | | | |
| CrossDockMode | LTL | | | |
| DestinationCity | ALANTA | ALANTA | ATLANTA | ALANTA |
| DestinationState | GA | GA | GA | GA |
| DestinationCountry | US | US | US | US |
| DestinationMode | LTL | LTL | TL | TL |
| OrderFrequency | 42 | 42 | 21 | 21 |
| SupplierPoundsPerOrder | 80 | 80 | 80 | 80 |
| WeightInPoundsPerOrder | 14,533.00 | 14,533.00 | 29,066.00 | 29,066.00 |
| DistanceInMilesPerOrder | 860 | 769 | 769 | 345 |
| TotalMileTonsPerYear | 238,037 | 212,925 | 212,925 | 95,647 |
| CarbonEmissionKG | 59,599.70 | 53,312.24 | 26,656.12 | 11,970.24 |
| CarbonEmissionDollars | 2,145.59 | 1,919.24 | 959.62 | 430.93 |
| InventoryCarryingCostDollars | 78,131.10 | 67,237.60 | 34,458.80 | 16,862.49 |
| InventoryCarryingCostDollars | 36,698.98 | 36,698.98 | 61,253.97 | 61,253.97 |
| Total CostDollars | 116,975.66 | 105,855.81 | 96,672.39 | 78,547.38 |
| AverageInventoryLevelDollars | 366,989.76 | 366,989.76 | 612,539.66 | 612,539.66 |
| InventoryTurns | 56.4 | 56.4 | 33.8 | 33.8 |
| InventoryAvailabilityPercent | 99 | 99 | 99 | 99 |
| InventoryLiabilityDollars | 371,504.99 | 374,504.99 | 370,862.63 | 370,862.63 |

Compare sourcing options by carbon, cost and business metrics

FIG. 8

CARBON MANAGEMENT FOR SOURCING AND LOGISTICS

CROSS REFERENCE TO RELATED APPLICATION

This application is a continuation of copending U.S. patent application Ser. No. 12/323,775, filed Nov. 26, 2008 the disclosure of which is hereby incorporated herein by reference in its entirety.

BACKGROUND OF THE INVENTION

1. Field of the Invention

This invention generally relates to carbon management, and more specifically, the invention relates to carbon management for sourcing and logistics.

2. Background Art

An accelerating rate of change in the amounts of trace gases in the earth's atmosphere has the potential to modify the earth's energy balance, which may result in a variety of consequences. These trace gases are often referred to as greenhouse gases and include carbon dioxide. Although there is disagreement concerning the potential threats or benefits of this change, there is widespread agreement in the global community that it is prudent to enact policies to attempt to slow down the rate of change. At the same time, research is underway to predict the consequences of increasing greenhouse gas concentrations and to develop the technology to economically limit those increases. All current protocols have established emission reduction targets that define 1990 as the base year and specify reductions as a fractional percentage of emission rates during that base year.

Energy and carbon emission management in logistics has become one of the top priorities in green practices. Typical logistics optimization only considers the direct monetary costs and other traditional performance measures such as customer service. Optimal logistics policies can be significantly different with the inclusion of broader environmental costs, and constraints.

SUMMARY OF THE INVENTION

Embodiments of the invention provide a method, system and computer program product for carbon management for sourcing and logistics. In one embodiment, the method comprises using a computer for quantifying both a cost and a carbon impact of one or more logistics policies relating to a manufacturing process; and minimizing said cost and carbon impact using a defined equation including a first component representing a transportation cost, a second component including an inventory cost, and a third component representing a carbon cost.

In an embodiment of the invention, the quantifying step includes the step of using an analytics engine to quantify said cost, carbon impact. The analytics engine may include a shipment analysis module to calculate an optimal policy. The analytics engine may further include a scenario analysis module to calculate performance metrics for consolidation scenarios. The analytics engine may include a sensitivity analysis module to test the impact of changes on performance metrics to uncontrollable or uncertain input parameters.

In an embodiment of the invention, the quantifying includes using a regression model for transportation cost calculation by mode of transportation and by transportation fuel used. Also, the quantifying may include calculating an origin to destination air distance using latitude and longitudinal data, and calculating an origin to destination road distance by adjusting the origin to destination air distance by a road distance correction factor. Also, the quantifying may include using carbon prices or carbon taxes to calculate the carbon cost.

Embodiments of the invention provide manufacturing businesses a system to measure and monitor the carbon footprint of their inbound logistics operations, and give businesses an ability to reduce their carbon emissions in the best possible way in their inbound logistics activities. Embodiments of the invention also enable businesses to execute carbon management policies throughout their inbound logistics operations, help businesses claim carbon credits to increase their revenue from trading in carbon exchanges, and help businesses to maximize their after tax profit in case of a possible carbon tax.

Embodiments of the invention use analytics to solve an optimization problem. In an embodiment of the invention, the optimization problem includes minimizing transportation costs, inventory costs, and carbon costs (analytics); or minimizing transportation costs and inventory costs subject to a carbon constraint where carbon emissions cannot exceed a target amount (analytics); or minimizing carbon amount subject to a budget constraint where transportation and inventory costs cannot exceed a target amount (analytics). The optimization problem may include a service constraint. The optimization problem may use regression to estimate unit transportation cost for each carrier and mode (analytics), carbon exchange prices for carbon cost calculation (analytics), adjustment factors for truck distance calculations (analytics), dynamic tables to identify the best action (software), and smart checks and automatic data fills in sourcing analysis (software).

BRIEF DESCRIPTION OF THE DRAWINGS

FIG. 4 is a Table that list road distance correction factors.

FIG. 8 shows an output Sourcing Analysis table.

DETAILED DESCRIPTION OF THE PREFERRED EMBODIMENTS

Figure 1:
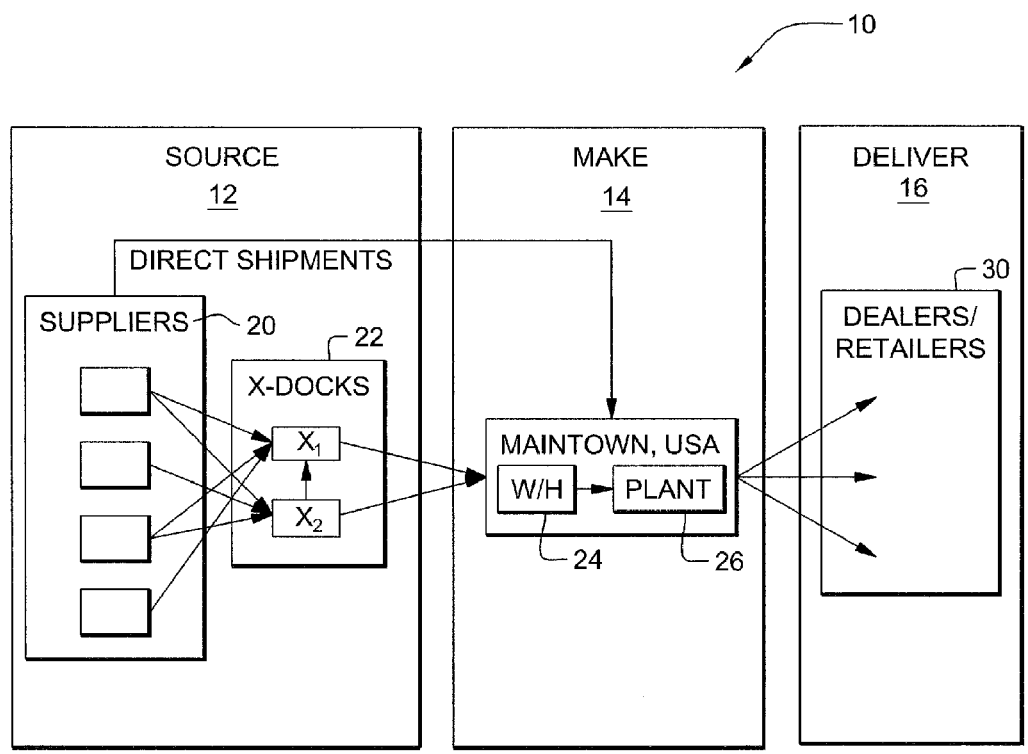
FIG. 1 represents a manufacturing environment in which this invention may be practiced.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The present invention relates to a carbon management method and system for sourcing and logistics, and FIG. 1 illustrates a manufacturing environment 10 in which the present invention may be used. In particular, in FIG. 1, a source of parts and goods is represented at 12, a maker is represented at 14, and a delivery of the manufactured goods is represented at 16. As represented in FIG. 1, the source includes suppliers 20 and docks 22, the maker includes a warehouse 24 and a plant 26, and the delivery part of the process involves dealers and/or retailers 30.

Figure 2:
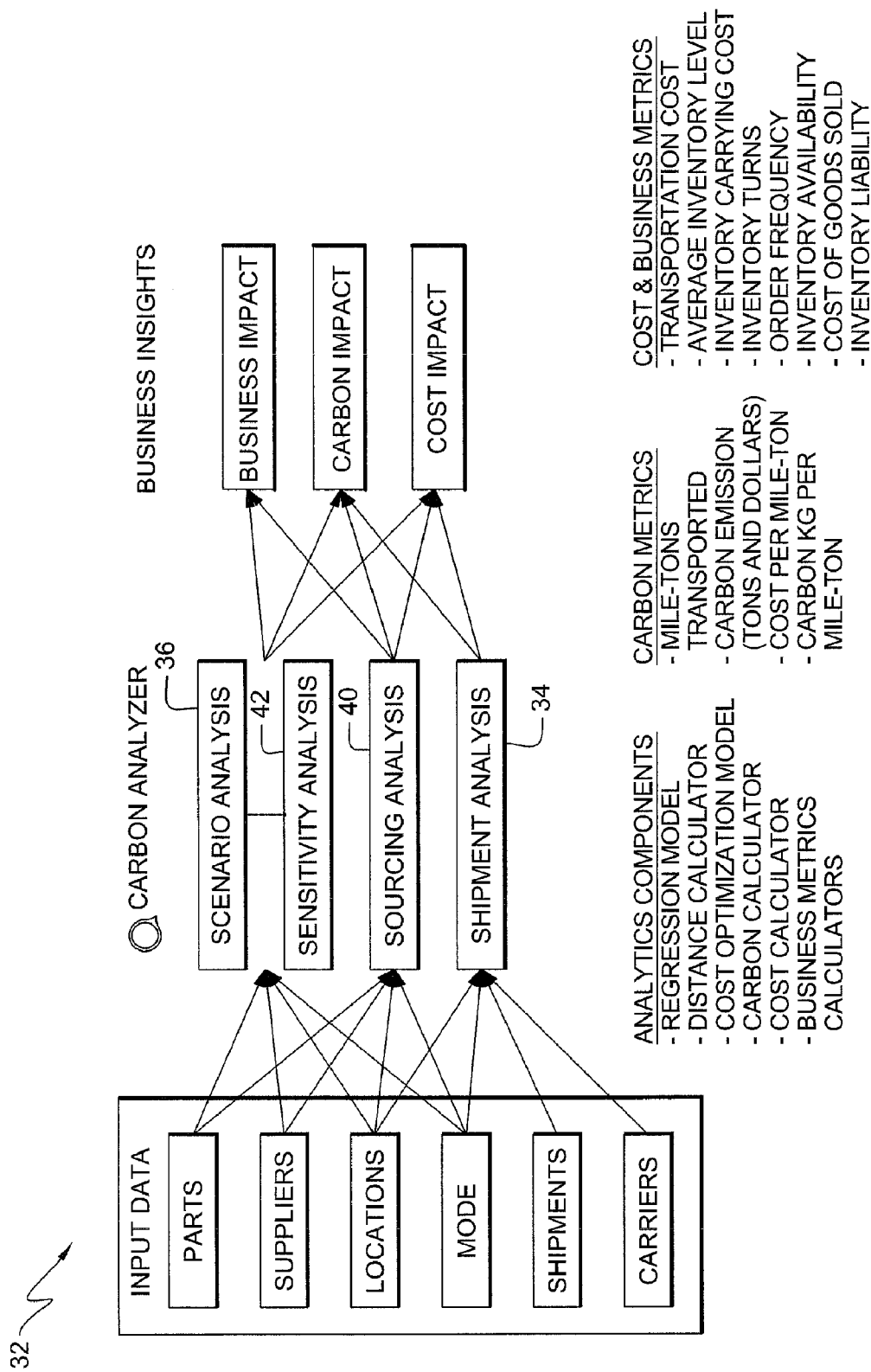
FIG. 2 shows a Model Framework Overview.

FIG. 2 illustrates an overview of a carbon management model 32 in accordance with an embodiment of the invention. The overview of FIG. 2 shows three major components: input data, carbon analyzer, and business insights. The input data includes data relating to parts, suppliers, locations, transportation mode, shipments and carriers. The carbon analyzer includes for analysis or analysis modules: shipment analyses 34, scenario analysis 36, sourcing analysis 40 and sensitivity analysis 42. The business insights that the management model provides include information about the business impact, the carbon impact, and the cost impact.

Figure 3:
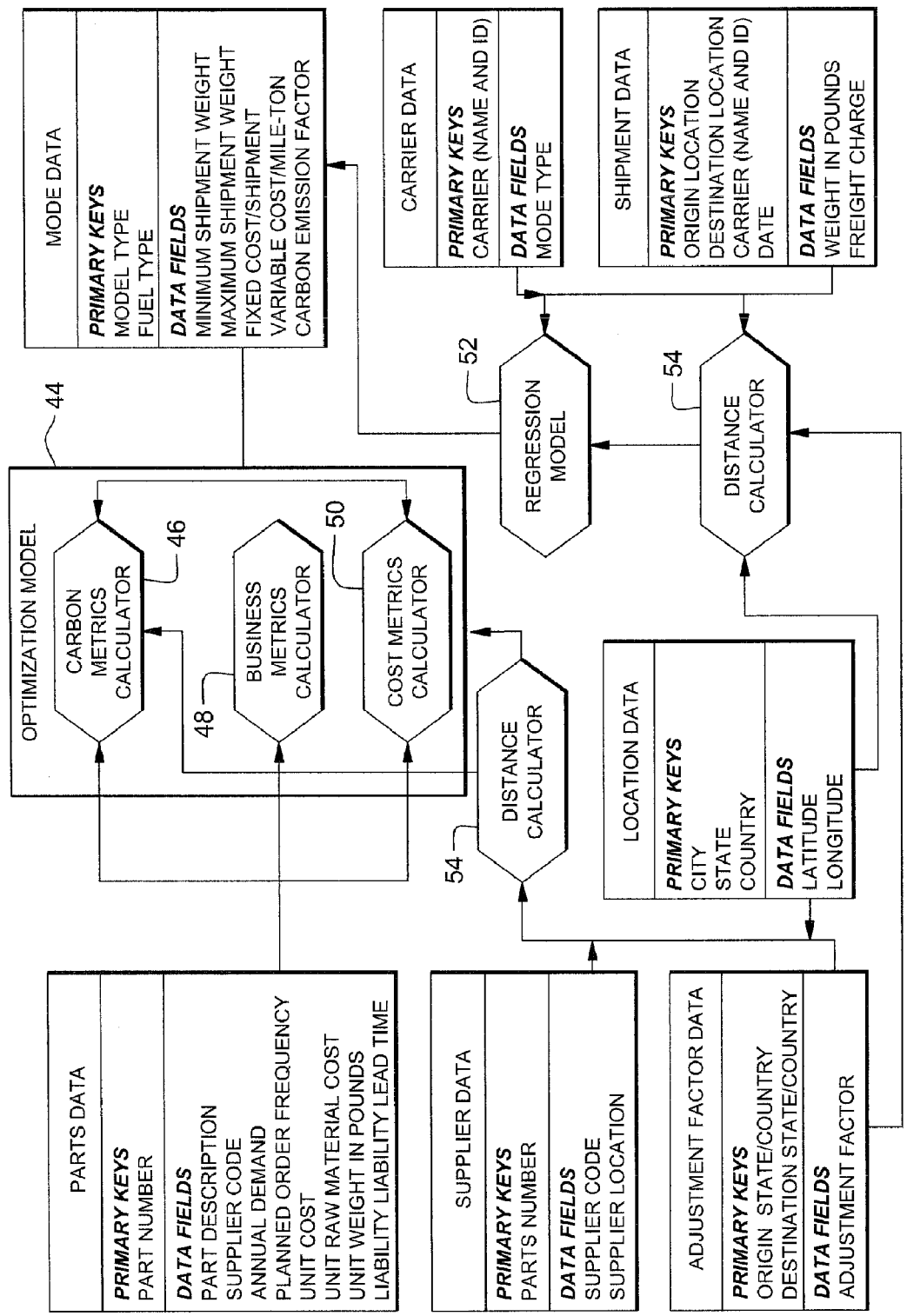
FIG. 3 shows a scenario analysis data flow for metrics calculations.

FIG. 3 shows a scenario analysis data flow for metrics calculations. This data flow utilizes an optimization model 44 that, in turn, includes a carbon metrics calculator 40, a business metrics calculator 48, and a cost metrics calculator 50. The data flow of FIG. 3 also uses a regressive model 52 and a distance calculator 54 (shown twice in FIG. 3). As illustrated in FIG. 3, the data flow uses parts data, supplier data, adjustment factor data, node data, carrier data and shipment data.

Output metrics of the data analyses may include mile-tons transported, carbon emission tons, carbon emission dollars, cost per mile-ton, and carbon KG per mile-ton. Other metrics that may be output include transportation cost dollars, cost of goods sold dollars, average inventory level dollars, inventory turns, order frequency, inventory availability percent, inventory carrying cost dollars, and inventory liability dollars.

Distance Calculations

Travel distance is calculated using a derivation from the well-established Haversine Formula for navigation (Sinnott [14]). To compute air and ocean distance (Dist) from an origin located at latitude Lat1 and longitude Lon1 to a destination at latitude Lat2 and longitude Lon2, we use:

$$a = \sin\left((Lat_1 - Lat_2)\frac{\pi}{360}\right)$$

$$b = \cos\left(Lat_1 \frac{\pi}{180}\right)\cos\left(Lat_2 \frac{\pi}{180}\right)$$

$$c = \sin\left((Lon_1 - Lon_2)\frac{\pi}{360}\right)$$

$$Dist = 7926.38 * a\sin\left(\sqrt{a^2 + bc^2}\right)$$

where 7926.38 is the diameter of the Earth at the equator, in miles. In order to calculate the truck distance (TruckDist), we use the formula below:

$$TruckDist = Dist * AdjFactor$$

AdjFactor is the road distance correction factor used to convert air distance to truck distance and it depends on the origin state/country and the destination state/country. To obtain the adjustment factor, for every origin state/country and destination state/country pair, we sampled the true road distances between randomly chosen origin and destination cities and calculated the average adjustment factor using the ratios of the true road distance and Dist calculated using the formula given earlier. We found that such a distance calculation model was within 10% of the shortest, practical road distance for all the origin-destination pairs we tested. The advantage of this simple adjusted model is that it eliminates the need for a GIS software dependency for road distance calculations. The table of FIG. 4 shows example road distance correction factors, which were calculated by using actual road distances for sample origin-destination parts.

As mentioned above, the data model for analysis shown in FIG. 3 includes a Regression model, and more specifically, a regression model for transportation cost calculation by mode type. Transportation costs are estimated by the following regression model:

$$Freight\ Charge = FixedCost + VariableCost * MileTons$$

Figures 5, 6:
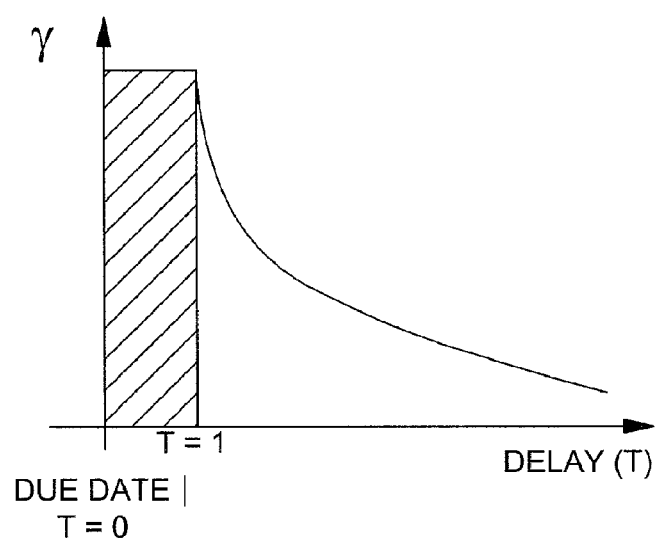
FIG. 5 is a Table that gives fixed and variable costs for several modes of transportation.
FIG. 6 shows a distribution of product delivery delays.

The table of FIG. 5 lists sample fixed cost values and variable cost values for several modes of transportation. For instance, as shown in this table, for the transportation mode type "LTL," the fixed cost is $70 and the variable cost is $0.30 per mile-ton; and for the "Air" transportation mode type, the fixed cost is $450, and the variable cost is $1.90 per mile-ton.
Carbon Emission Factors Carbon emission for diesel fuel is 250 grams per mile-ton. Carbon multipliers (with respect to diesel) for various fuel types are as follows:

Natural gas=0.81*Gasoline
Hybrid=0.9*Gasoline
Propane=0.91*Gasoline
Gasoline=0.935*Diesel Carbon emissions for different transportation modes must be different. We assumed carbon emissions for different mode types are proportional to their variable transportation cost parameters (see the regression model).Model Formulation for Cost Minimization We formulate a cost optimization problem that obtains the optimal order frequency (and by extension, the lot size since the demand is an input). The total cost that is optimized consists is comprised of inventory carrying charge, transportation cost, and carbon cost. In addition to modeling the work-in-process at the manufacturing plant, we also model the safety stock carried by the manufacturing plant to achieve desired inventory availability targets in the presence supplier delivery reliability issues. Work-in-process inventory and safety stock are indicators of the amount of capital that is tied up in the plant and thus provide good indications of supply chain performance. Inventory availability is defined as the percentage of time the parts are available in stock at the time they are needed by manufacturing. Before we discuss the modeling aspects, we list the notation used below.
Inputs:
D=Constant demand rate of a given part
γ=Supplier reliability target, the percentage of orders that are delivered on-time by the supplier
T=Random variable representing supply delay (i.e. time by which an order is late)
φ(.)=Probability density function of T
Φ(.)=Cumulative distribution function of T
α=Target inventory availability to manufacturing
h=Annual inventory carrying rate (in %)
C=Unit cost (in %)
w=Unit weight (in tons)
m=Distance of supplier from manufacturing plant (in miles)
a=Fixed transportation cost parameter (in $ per shipment)
b=Variable transportation cost parameter (in $ per mile-ton)
ψ=Carbon cost (in $ per mile-ton)
Decision Variables:
s=Safety lead time associated with the orders to help meet target inventory availability
Q=Stationary order lot size of orders placed on suppliers
n=Stationary order frequency given by $$\left(\frac{D}{Q}\right)$$

Functions:
Pr{.}=Probability function
E(.)=Expected value function
$(x-y)^+$=Maximum of (x-y) and zero In one embodiment, we assume that Materials Requirements Planning (MRP) uses a forecast and generates supply requirements for components. Supply requirements are calculated by netting the safety stock requirements and on-hand inventory and hence are fixed quantities. In one embodiment, we assume demand for a part is a known quantity and occurs at a constant rate, D, since it is the supply requirement that comes from MRP. The formulation of the problem can easily be extended to other embodiments where we have a non-stationary problem with demand varying from period to period. For ease of illustration, we will only consider constant demand rate here. Therefore, a stationary order lot size Q is used to satisfy the demand. We will now calculate the long run average inventory availability, which is the same as the average inventory availability of a lot of size Q, due to stationary lot size quantity. Without loss of generality, assuming first in first out (FIFO) inventory accounting, a given unit i (i=1, . . . , Q) in the lot will be needed at time $$\left(\frac{i}{D}\right)$$

from the target order delivery date. Since suppliers are not completely reliable and since we use a safety lead time of s, the probability that unit i will be available to manufacturing on-time is given by:

$$\Phi\left(\frac{i}{D}+s\right),$$

where Φ(.) is the cumulative distribution function of T, the random variable representing the supply delay (i.e. the time by which an order is late compared to the due date.) We can derive the average inventory availability for this embodiment as:

$$\text{Inventory Availability} = n\left[E\left(\frac{1}{n} + s - T\right)^+ - E(s-T)^+\right]$$

The model formulation is to minimize:

Inventory Carrying Cost+Transportation Cost+Carbon Cost

Subject to manufacturing availability target.

Expressed in terms of variables, this model formulation, in one embodiment, is to minimize:

$$\left(\frac{D}{2n} + E(s-T)^+ D\right).h.C + a.n + b.w.m.D + \psi.w.m.D$$

Subject to $$n\left[E\left(\frac{1}{n} + s - T\right)^+ - E(s-T)^+\right] \geq \alpha$$

Where,

Inventory carrying charge: The average inventory level at the plant is the sum of the work-in-process inventory and the safety stock inventory. The work-in-process inventory, given by $$\left(\frac{D}{2n}\right),$$

depends on demand and order frequency. The safety stock inventory captures the additional inventory in the plant due to the expected amount of time by which each part is early. This safety stock, given by $(E(s-T)^+D)$, depends on demand, safety lead time, and delivery delay distribution. We model the inventory carrying charge as the product of the average inventory level and the unit carrying charge (hC).

Transportation cost: The transportation cost is modeled as the sum of a fixed cost component, which depends on the fixed cost per shipment and the order frequency (a.n), and a variable cost component that depends on the variable cost per mile-ton transported and the total mile tons transported (b.w.m.D).

Carbon cost: The carbon cost is defined as the product of the carbon price per mile-ton transported and the total mile-tons transported ($\psi$.w.m.D). The carbon price per mile-ton transported is obtained as the product of the carbon emission factor and the carbon price per ton of emission.

The manufacturing availability target constraint is:

$$n\left[E\left(\frac{1}{n} + s - T\right)^+ - E(s-T)^+\right] \geq \alpha$$

Estimating Delays Using Supplier Reliability

In one embodiment, we define supplier reliability to be the percentage of shipments that arrive within 1 day of due date. In one embodiment, the distribution shown in FIG. 6 may be used to calculate inventory availability and inventory costs due to early arrivals. If a shipment arrives later than a day, we assume that the distribution of shipment delay (T) follows an exponential distribution with parameter $\lambda$. In this embodiment, we use the probability distribution below to model supplier reliability.

$$Pr\{T \leq 0\} = \Phi(0) = 0$$
$$Pr\{0 \leq T \leq 1\} = \Phi(1) = \Phi(0) = \gamma$$
$$Pr\{T \geq 1\} = 1 - \Phi(1) = 1 - \gamma = e^{-\lambda}$$
$$\lambda = -\ln(1-\gamma)$$
$$\phi(x) = \begin{cases} 0, x \leq 0 \\ \gamma, 0 < x \leq 1 \\ \lambda e^{-\lambda x}, x > 1 \end{cases}$$

This distribution simply has a constant value for the interval [0, 1] and follows an exponential distribution thereafter. During the implementation of this model, the customer data available to us showed that in the majority of the cases, deliveries were on time, which is represented by the constant value in the interval [0, 1]. When a delivery was late, it was appropriate to assume that the delay followed an exponential distribution with parameter $\lambda$. If another distribution provides a better fit, the derivations shown in this embodiment will need to be modified using that distribution. After some simple algebra, we can rewrite the inventory availability in (4) as follows:

Inventory Availability=

$$n\left[E\left(\frac{1}{n} + s - T\right)^+ - E(s-T)^+\right] = 1 - \frac{n(1-\gamma)^s}{\lambda}\left(1 - (1-\gamma)^{\frac{1}{n}}\right)$$

Finding the Best Transportation Mode

Embodiments of the invention can also advise on best transportation mode to use by solving the optimization model for all feasible transportation modes and picking the one with the lowest cost. However, based on the transportation mode for which we solve the problem, we would need to include additional constraints on the order frequency choice. For example, we know that truck load (TL) shipments are generally less expensive. However, in order for a shipment to qualify for a TL, it must have a minimum weight. If lot sizes can be increased to qualify for TL, we can reduce carbon and transportation costs. On the other hand, large lot sizes increase inventory levels and hence, inventory carrying charge. This trade-off is also optimized by our formulation.

Devising Consolidation Strategies

Embodiments of this invention can also help with devising order consolidation strategies.

In one embodiment, we simply use planned order frequencies for parts (i.e. supply requirements and their frequencies given by the MRP plan) without any additional consolidation effort. For all feasible transportation modes using the planned order frequency for every part, we compute safety lead time that helps achieve the target manufacturing availability. We then choose the mode for each part that gives the lowest cost.

In a second embodiment, we can solve the cost minimization problem for every individual part to find the optimal order frequency and safety lead time. For all feasible transportation modes, solve the cost optimization problem for all parts and find optimal order frequency and safety lead time combination. We choose the mode for each part that gives the lowest cost.

In a third embodiment, we can consolidate all parts that are sourced from the same supplier. We create an artificial part for each supplier by setting demand to the sum of demands for all parts served by the supplier and setting other inputs to be a demand-weighted combination of all parts served by the supplier. We then solve the consolidation problem for all the artificial parts similar to the second embodiment. Now, we use the results for the artificial part to create the individual part metrics.

In a fourth embodiment, we can consolidate parts across suppliers within the same state and solve the cost minimization problem to find the optimal order frequency and safety lead time. We assume that we can do milk-runs across suppliers in the same state. We first group all suppliers by state and country and create an artificial supplier for every state, representing all suppliers in that state. This artificial supplier would serve all parts that were served by suppliers in that state. We then compute a milk run for each state by starting from the plant and going to the nearest supplier not visited next. We adjust the distance and mile-tons for all parts sourced from this artificial supplier based on their position in the milk run route, i.e., parts served by the first supplier in the milk run route would get the original distance and mile-tons for those parts, parts served by the second supplier would get the distance of the plant from the first supplier and the distance between the first and second supplier (The mile-tons would be adjusted based on this distance) and so on. Now, we solve the consolidation problem for the set of artificial suppliers and parts similar to the third embodiment.

In a fifth embodiment, we can test the effect of reducing the supplier base by assuming that all suppliers in a given state can be consolidated to the location in the state closest to the manufacturing plant and execute the same supplier, multiple parts consolidation policy for the consolidated supplier location. We first group all suppliers by state and country and create an artificial supplier for every state, representing all suppliers in that state at the closest location in the state to the manufacturing plant. We then set the distance and mile-tons for all parts sourced from this artificial supplier based on the location fixed for the artificial supplier. Now, can solve the consolidation problem for the set of artificial suppliers and parts similar to the third embodiment.

In a sixth embodiment, we can test the effect of moving suppliers closer to the manufacturing plant. We first reduce the distance to manufacturing plant for all suppliers (and the mile-tons of their corresponding parts) to 50% of their original values and then execute the fifth consolidation embodiment.

Embodiments of the invention can provide manufacturing businesses a system to measure and monitor the carbon footprint of their inbound logistics operations, and give businesses an ability to reduce their carbon emissions in the best possible way in their inbound logistics activities. Embodiments of the invention also enable businesses to execute carbon management policies throughout their inbound logistics operations, help businesses claim carbon credits to increase their revenue from trading in carbon exchanges, and help businesses to maximize their after tax profit in case of a possible carbon tax.

There is substantial market opportunity for carbon management. 80% of Financial Times 500 (FT500) companies responding to a Carbon Disclosure Project Survey attested that climate change presents risks to their operations. At least 50% of carbon emissions come from supply chain operations. Carbon management in CP and Retail is a large market due to the priority of sustainability and budget allocation to new sustainability organizations. General consensus from 2007 panel on US regulatory environment was that there will be US carbon regulation within 3-5 years, probably a Cap and Trade system. Government regulations are already coming: 375 statewide bills and 27 federal bills were issued in the US in 2007.

Carbon prices on carbon exchanges present sizeable revenue opportunities for carbon reduction credits. Annual global emissions are valued at $1.2 trillion in EU carbon exchange, and annual US emissions are valued at $25 billion in Chicago carbon exchange. eyefortransport.com had a survey of 277 senior executives on "what green initiatives are either planned or currently executed". The following responses indicate the existence of a strong market for carbon management solutions: 42% strategic warehouse relocation, 20% using more environmentally friendly logistics providers, 39% emissions measuring and reductions, 42% vehicle rerouting optimization, and 27% use of alternative fuels.

FIGS. 7-10 illustrate in greater detail aspects of the Shipment Analysis, the Scenario Analysis, the Sourcing Analysis and the Sensitivity Analysis shown in FIG. 2.

The Shipment Analysis module 34 provides a set of tools to analyze the historical shipment records. This step typically takes place first to help the user establish a baseline for their carbon emissions and also look for initial business insights and quick wins. The objective of this analysis is to compute carbon emissions from the inbound transportation activities of shipping product components from suppliers to the assembly plant and identify opportunities to reduce overall carbon emissions. The reports produced by the analysis allow the user to sort the actions according to their carbon and cost reduction potential.

The analysis can be performed at various levels of granularity to allow for different deep-dive views. Such "entity-centric" analyses include a carrier-centric analysis, an origin state-centric analysis, an origin city-centric analysis and the most detailed granularity which is transportation lane-centric analysis, where a transportation lane is defined by a combination of origin, destination and carrier. One advantage of this structure is that it allows users to first identify the top origin states to focus on, then narrow down to a city and finally, to a given transportation lane.

Operational actions that a user can test are combinations of fuel type, fuel mix and level of truckload consolidation. The fuel type and fuel mix indicate what percentage of a given fuel should be used for transportation along with the default fuel type of a given mode. Truckload consolidation converts multiple less-than-truck load (LTL) shipments to a single truckload shipment. The motivation behind such a definition is that using truckload shipments along with a fuel type that has a low carbon emission factor enables the users to reduce carbon emissions. Since it might not be feasible to convert the entire set of shipments to truckload or to a given fuel type, the tool allows the user to specify a truckload consolidation percentage and a fuel mix percentage. The user can test any choice of operational actions for each of the entity-centric analyses. The tool can be easily extended to similar user-defined hybrid transportation strategies such as a mix of ocean and air shipments. However, we do not perform any optimization at this stage, but do so in the scenario analysis module. Examples of questions that can be answered by the shipment analysis are "What operational action gives the best carbon reduction with the least cost impact?", "What are the top origin states to focus on for carbon emission reductions?" and "Which are the top carriers to focus on in order to achieve a target amount of carbon reduction with a given operational action?".

Figure 7:
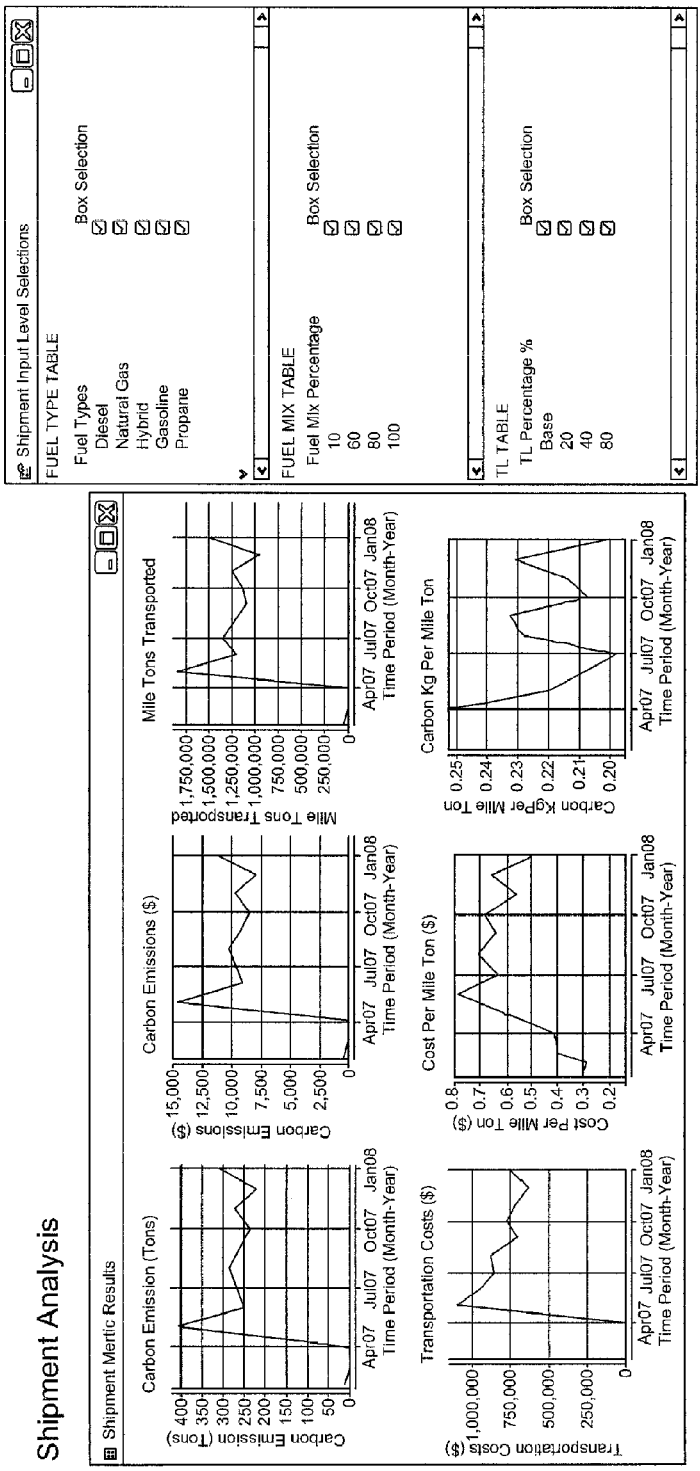
FIG. 7 illustrates results of a Shipment Analysis.

FIG. 7 shows a Shipment Analysis. In particular, this FIG. shows carbon emission in terms of tons, carbon emission in terms of dollars, mile-tons transported, transportation cost, cost per mile-ton, and carbon kg per mile-ton.

The Sourcing Analysis Module 40 is used to test alternate sourcing options. This module focuses on evaluating the sourcing alternatives. In particular, it allows users to focus on a single part or a single supplier of their choice. The sourcing analysis can be used to test the impact of changes to component shipment frequencies, supplier reliabilities, sourcing, routing, and transportation-mode options on the carbon metrics as well as cost and other performance metrics. A sourcing analysis can be performed for a given part or all parts sourced from a given supplier. The user defines the sourcing alternatives to evaluate. Then, for sourcing alternatives defined, the analysis calculates the output metrics. Some examples of questions that can be answered by the sensitivity analysis module include "What is the carbon, cost and business impact of changing a supplier location?", "What is the carbon, cost and business impact of adding/changing/removing a cross-dock?" and "What is the carbon, cost and business impact of changing the transportation mode or the order frequency?"

The table of FIG. 8 shows the results of Sourcing Analysis. In particular, this table lists a number of items, such as part number, supplier codes, destination codes, and carbon emission KG. For each of these items, the table gives a value for the item for each of a number of options. For example, options one and two for destination mode are both LTL, and options three and four for destination mode are both TL. This table allows a comparison of sourcing options by carbon, cost and business metrics.

The Scenario Analysis Module 36 is used to find an optimal order frequency for each part that minimizes the total cost, as given by the equation:

Total Cost=Carbon Cost+Inventory Cost+Transportation Cost

This is subject to inventory availability constraints.

This module allows users to set their policy parameters and define scenarios of external parameters. Policy parameters represent things that are generally considered controllable, and they include supply consolidation strategies and fuel types to be used. The external parameters represent things that are generally uncontrollable, and they include demand and carbon price. For each policy and scenario pair, we find the optimal order frequency that minimizes the total cost while achieving inventory availability requirements. The total cost is defined as the sum of the carbon cost, transportation cost and inventory carrying cost. The analysis also computes the carbon metrics along with cost and business metrics so that the user can make carbon-versus cost trade-offs. Some examples of questions that can be answered by this module include "What should be the optimal consolidation policy and order frequency for the suppliers?" and "What is the trade-off between carbon metrics, cost metrics and inventory metrics across consolidation policies?"

The Scenario Analysis Module may also be used to test the effect of shipment consolidation policies that combine multiple parts to increase truckload shipments while not significantly increasing part-level inventory. These consolidation policies were presented earlier using six embodiments.

Figure 9:
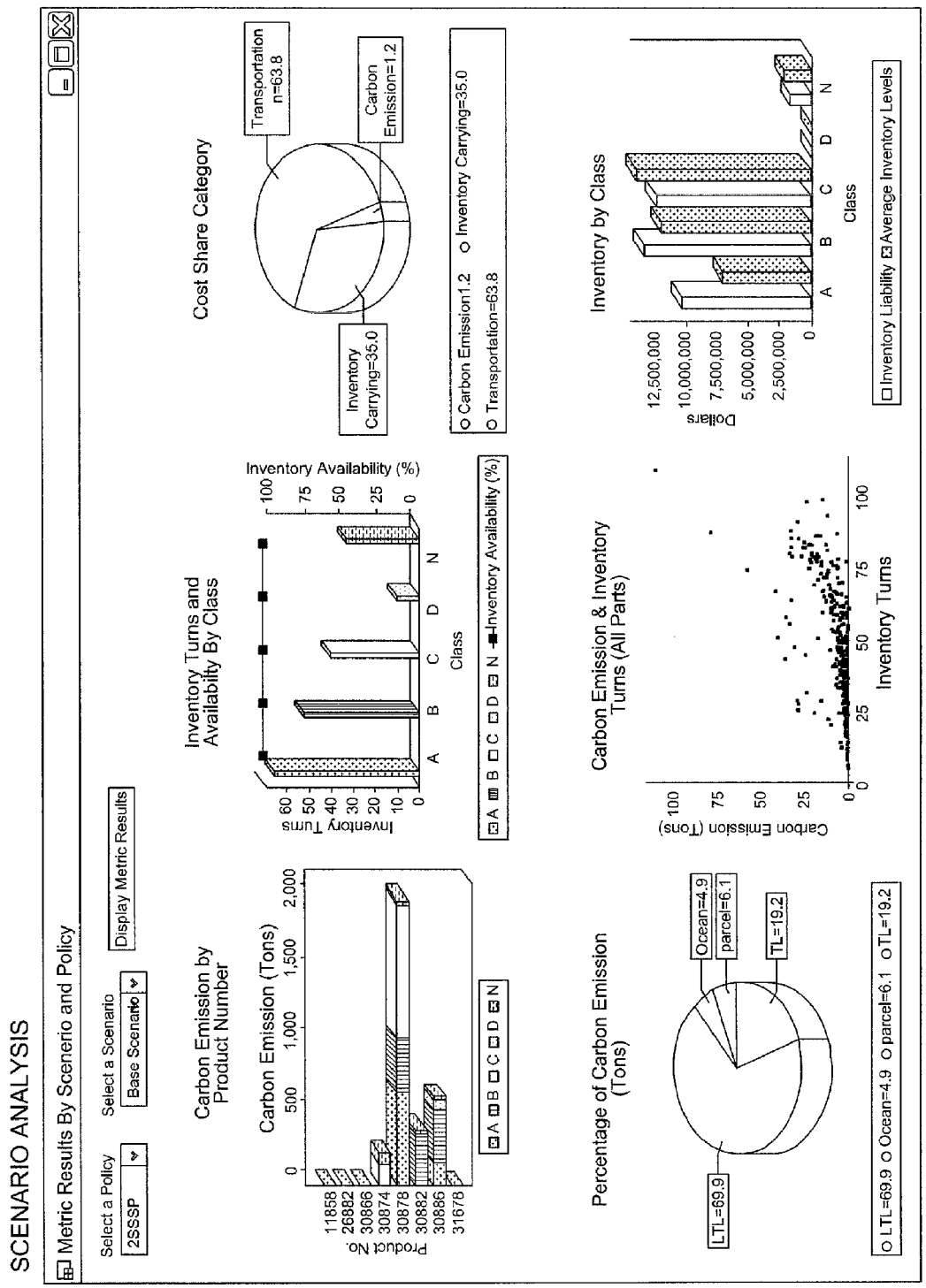
FIG. 9 illustrates the results of a Scenario Analysis.

FIG. 9 shows results obtained from the Scenario Analysis. More specifically, FIG. 9 shows carbon emission by product number, inventory turns and availability by class, a cost share category percentage of carbon emission (tons), carbon emission and inventory turns (all parts), and inventory by class.

The Sensitivity Analysis Module 42 is associated with the Scenario Analysis and allows users to focus on a single external (uncontrollable) parameter of their choice. These parameters may include carbon price, demand, supplier reliability, carbon emission factor, annual inventory carrying charge, unit cost, unit weight, unit shipment cost, and liability lead time. For a given set of consolidation policy parameters and with all other external parameters being fixed, the sensitivity analysis computes the impact changes to the selected parameter within a user-given range on carbon, cost and business metrics. In essence, a sensitivity analysis is similar in concept to a scenario analysis, with one key difference: only one variable can be changed at a time. By providing the ability to isolate and characterize carbon, cost and business impact across a range of values for a single parameter representing an important real-world uncertainty, this module may be used to support the analysis of supply chain risk management scenarios. Some examples of questions that can be answered by the sensitivity analysis module include "What is the carbon, cost and business impact of changes to carbon price?", "What is the carbon, cost and business impact of changes to demand?" and "What is the carbon, cost and business impact of changes to carbon emission factor?"

Figure 10:
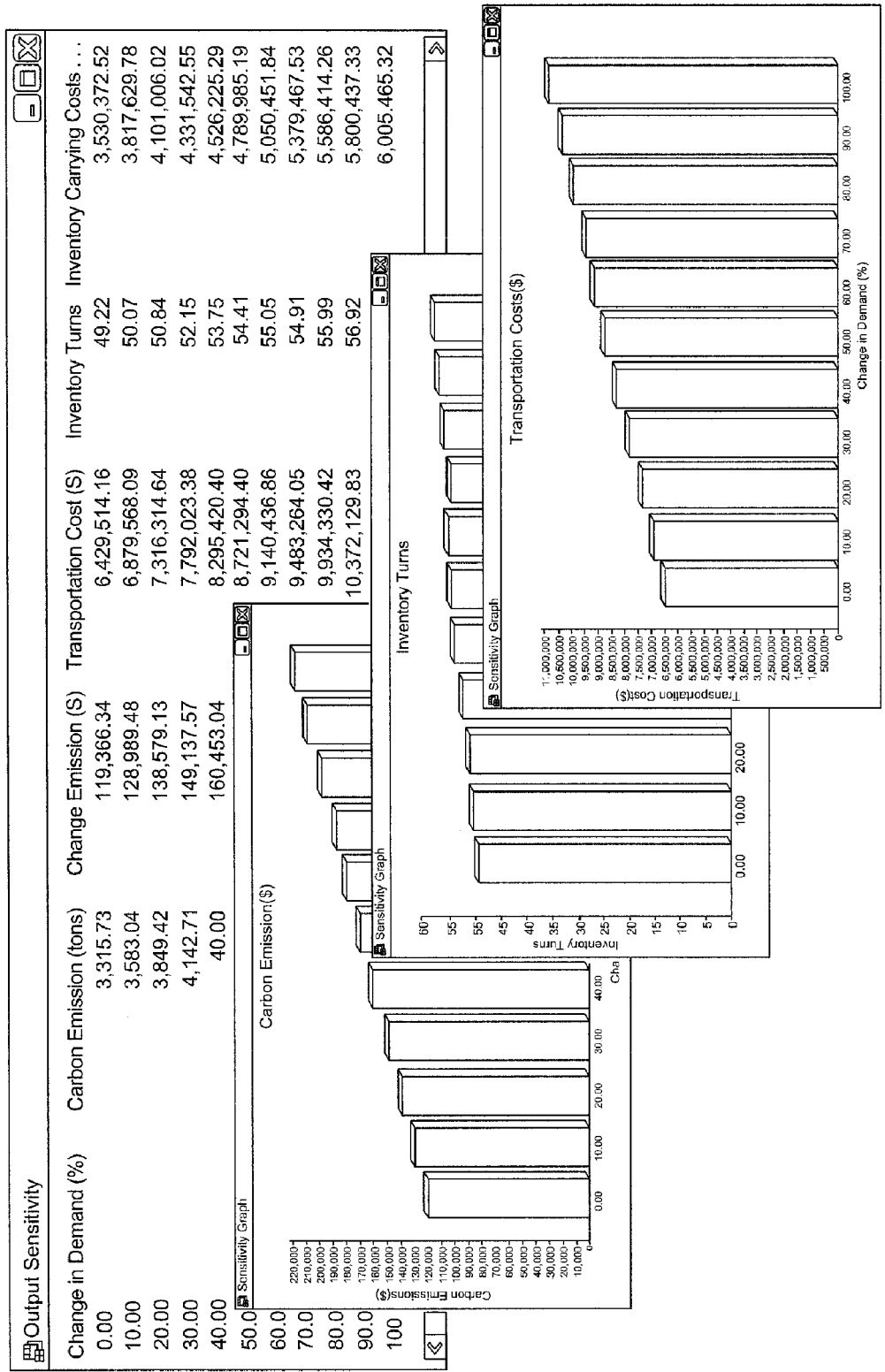
FIG. 10 shows the results of a Sensitivity Analysis.

FIG. 10 illustrates results of a sensitivity analysis. The table 92 shows how various factors, such as carbon emission and transportation cost, change as a function of percentage change in demand. This change in carbon emission, inventory turn and transportation costs are also shown in the charts 94, 96 and 98, respectively.

Figure 11:
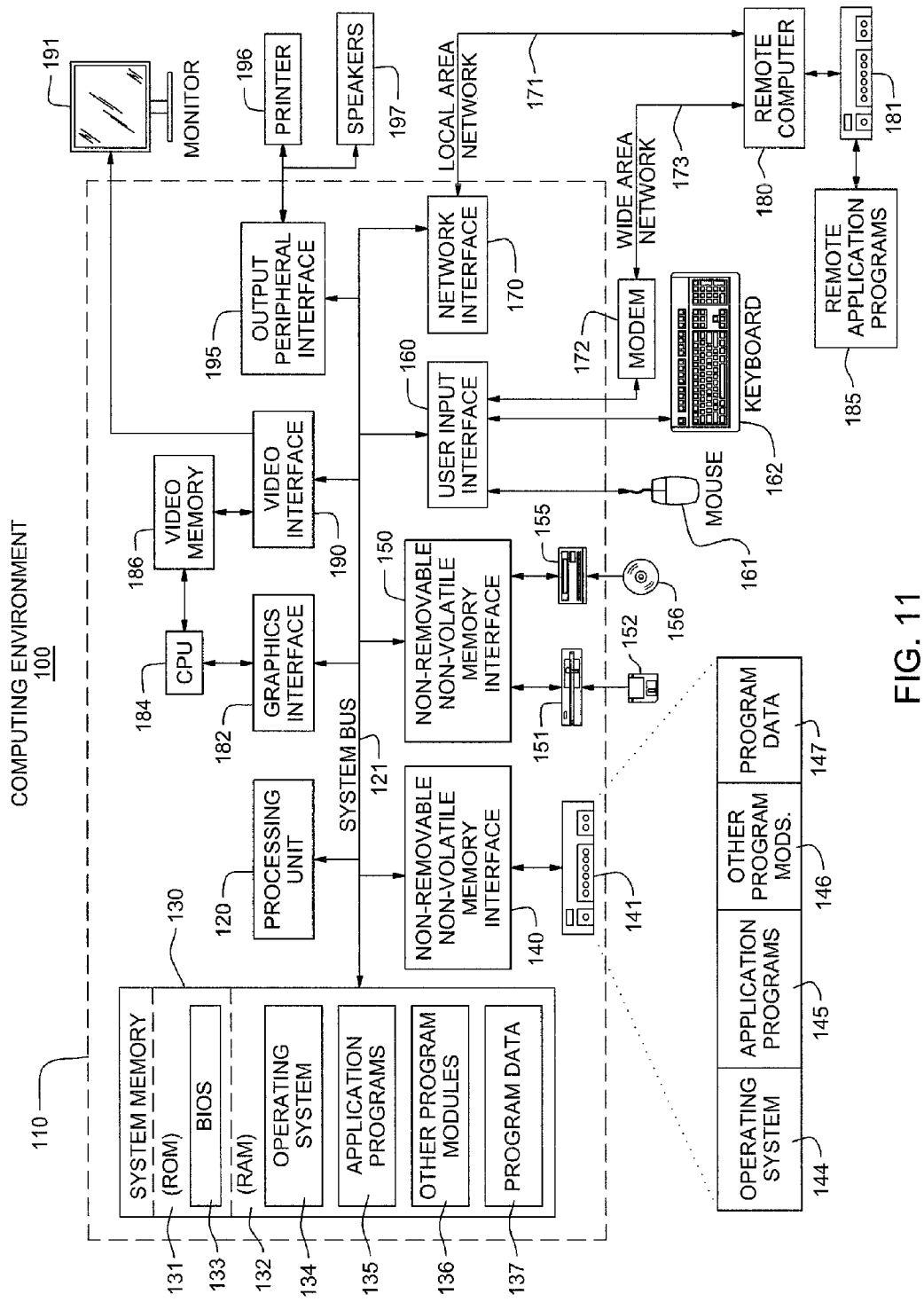
FIG. 11 illustrates a computing environment that may be used to implement the present invention.

For example, FIG. 11 and the following discussion provide a brief general description of a suitable computing environment in which the invention may be implemented. It should be understood, however, that handheld, portable, and other computing devices of all kinds are contemplated for use in connection with the present invention. While a general-purpose computer is described below, this is but one example, the present invention may be implemented in an environment of networked hosted services in which very little or minimal client resources are implicated, e.g., a networked environment in which the client device serves merely as a browser or interface to the World Wide Web.

Although not required, the invention can be implemented via an application-programming interface (API), for use by a developer, and/or included within the network browsing software, which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations.

Other well known computing systems, environments, and/or configurations that may be suitable for use with the invention include, but are not limited to, personal computers (PCs), server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 11, thus, illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 11, an exemplary system for implementing the invention includes a general purpose-computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 11 illustrates operating system 134, application programs 135, other program modules 136, and program data 137.

The computer 110 may also include other removable/non-removable, volatile/nonvolatile computer storage media. By way of example only, FIG. 3 illustrate a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 11 provide storage of computer readable instructions, data structures, program modules and other data for the computer 110. In FIG. 11, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host-processing unit 120, and assumes responsibility for accelerated graphics port (AGP) communications. One or more graphics processing units (GPUs) 684 may communicate with graphics interface 182. In this regard, GPUs 184 generally include on-chip memory storage, such as register storage and GPUs 184 communicate with a video memory 186. GPUs 184, however, are but one example of a coprocessor and thus a variety of co-processing devices may be included in computer 110. A monitor 191 or other type of display device is also connected to the system bus 121 via an interface, such as a video interface 190, which may in turn communicate with video memory 186. In addition to monitor 691, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 11. The logical connections depicted in FIG. 11 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 3 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

While it is apparent that the invention herein disclosed is well calculated to fulfill the advantages stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of carbon management for sourcing and logistics, comprising:
quantifying, by a computer, a cost, a service and a carbon impact of one or more logistics policies relating to a manufacturing process;
minimizing, by the computer, said cost and carbon impact using a defined optimization equation to determine a combination of a multitude of components relating to the shipment of the product components from the suppliers to the assembly plant, said multitude of components including a first component representing a transportation cost for shipping the product components from the suppliers to the assembly plant, a second component representing an inventory cost and a third component representing a carbon cost for carbon emissions from inbound transportation activities of the shipping the product components from the suppliers to the assembly plant, said third component including a carbon price per mile-ton transported for transporting the product components from the suppliers to the assembly plant, said carbon price per mile-ton transported being based on a specified carbon emission factor and a specified carbon price per ton of emission; and wherein:
the using the defined optimization equation includes using the defined optimization equation to obtain a specified order frequency for ordering parts from the suppliers.

2. The method according to claim 1, wherein the quantifying includes using an analytics engine to quantify said cost and carbon impact, said analytics engine including a shipment analysis module to compute carbon emissions from inbound transportation activities of shipping the product components from the suppliers to the assembly plant.

3. The method according to claim 2, wherein the analytics engine further includes a sourcing analysis module for testing alternate sourcing options.

4. The method according to claim 2, wherein the analytics engine further includes a scenario analysis module to find an optimal order frequency for each part that minimizes the total cost subject to a service constraint and decides on the best transportation mode for a given order consolidation policy.

5. The method according to claim 4, wherein the said consolidation policy is selected from the group comprising:
using planned order frequencies for shipments without any additional consolidation effort;
finding an order frequency and safety lead time for every individual shipment;
consolidating all shipments that are sourced from the same supplier and finding the optimal order frequency and safety lead time for the consolidated set of shipments;
consolidating shipments that are sourced within a defined geographical area bound for a destination that is defined within a determined geographical area;
consolidating shipments across suppliers within the same state by executing a milk-run across these suppliers and finding the optimal order frequency and safety lead time for the consolidated set of shipments;
reducing the supplier base by assuming that all suppliers in a given state can be consolidated to the location in the state closest to the manufacturing plant and finding the optimal order frequency and safety lead time for the consolidated set of shipments; and
reducing the supplier base by assuming that all suppliers in a given state can be consolidated to the location in the state closest to the manufacturing plant, moving suppliers closer to the manufacturing plant and finding the optimal order frequency and safety lead time for the consolidated set of shipments.

6. The method according to claim 2, wherein the analytics engine further includes a sensitivity analysis module to test the impact of changes to uncontrollable or uncertain input parameters.

7. The method according to claim 1, wherein the quantifying includes using a regression model for transportation cost calculation by mode of transportation.

8. The method according to claim 1, wherein the quantifying includes calculating an origin to destination air distance using latitude and longitudinal data.

9. The method according to claim 8, wherein the quantifying includes calculating an origin to distance road distance by adjusting the origin to destination to air distance by a road distance correction factor.

10. The method according to claim 1, wherein:
said first component is modeled as the sum of a fixed cost component, which depends on the fixed cost per shipment and the order frequency (a.n), and a variable cost component that depends on the variable cost per mile-ton transported and the total mile tons transported (b.w.m.D);

said second component is the inventory carrying charge, the average inventory level at the plant is the sum of the work-in-process inventory and the safety stock inventory; the work-in-process inventory, given by $$\left(\frac{D}{2n}\right),$$

depends on demand and order frequency; the safety stock inventory captures the additional inventory in the plant due to the expected amount of time by which each part is early; this safety stock, given by $(E(s-T)^+ D)$, depends on demand, safety lead time, delivery delay distribution; the inventory carrying charge is modeled as the product of the average inventory level and the unit carrying charge (hC);

said third component is, defined as the product of the carbon price per mile-ton transported and the total mile-tons transported ($\psi$.w.m.D); the carbon price per mile-ton transported is obtained as the product of the carbon emission factor and the carbon price per ton of emission;

the minimizing the cost and carbon impact includes minimizing $$\left(\frac{D}{2n} + E(s-T)^+ D\right).h.C + a.n + b.w.m.D + \psi.w.m.D$$

subject to a service constraint;

said service constraint is a manufacturing availability target constraint given by:

$$n\left[E\left(\frac{1}{n}+s-T\right)^+ - E(s-T)^+\right] \geq \alpha$$

Where
D = Constant demand rate of a given part
T = Random variable representing supply delay
α = Target inventory availability to manufacturing
h = Annual inventory carrying rate (in %)
C = Unit cost (in $)
w = Unit weight (in tons)
m = Distance of supplier from manufacturing plant (in miles)
a = Fixed transportation cost parameter (in $ per shipment)
b = Variable transportation cost parameter (in $ per mile-ton)
ψ = Carbon cost (in $ per mile-ton)
s = Safety lead time associated with the orders to help meet target inventory availability
n = Stationary order frequency given by $$\left(\frac{D}{Q}\right)$$

E(.) = Expected value function
$(x-y)^+$ = Maximum of (x-y) and zero.

11. The method according to claim 1, wherein the optimization equation includes inputs D, α, T, where:
D = Constant demand rate of a given part;
T = Random variable representing supply delay; and
α = Target inventory availability to manufacturing.

12. A system for carbon management for sourcing and logistics, the system comprising one or more processor units configured for:
quantifying both a cost and a carbon impact of one or more logistics policies relating to a manufacturing process in which specified product components are shipped from suppliers to an assembly plant; and
minimizing said cost, and carbon impact using a defined optimization equation to determine a combination of a multitude of components relating to the shipment of the product components from the suppliers to the assembly plant, said multitude of components including a first component representing a transportation cost for shipping the product components from the suppliers to the assembly plant, a second component representing an inventory cost and a third component representing a carbon cost for carbon emissions from inbound transportation activities of the shipping the product components from the suppliers to the assembly plant, said third component including a carbon price per mile-ton transported for transporting the product components from the suppliers to the assembly plant, said carbon price per mile-ton transported being based on a specified carbon emission factor and a specified carbon price per ton of emission; and wherein:
the using the defined optimization equation includes using the defined optimization equation to obtain a specified order frequency for ordering parts from the suppliers.

13. The system according to claim 12, wherein the quantifying is done by using an analytics engine to quantify said cost and carbon impact, said analytics engine including:
a shipment analysis module to compute carbon emissions from inbound transportation activities of shipping the product components from the suppliers to the assembly plant;
a sourcing analysis module for testing alternate sourcing options;
a scenario analysis module to find an optimal order frequency for each part that minimizes the total cost subject to a service constraint and decides on the best transportation mode for a given order consolidation policy; and
sensitivity analysis module to test the impact of changes to uncontrollable or uncertain input parameters.

14. The system according to claim 13, wherein the said consolidation policy is selected from the group comprising:
using planned order frequencies for shipments;
finding an order frequency and safety lead time for every individual shipment;
consolidating all shipments that are sourced from the same supplier and finding the optimal order frequency and safety lead time for the consolidated set of shipments;
consolidating shipments that are sourced within a defined geographical area bound for a destination that is defined within a determined geographical area;
consolidating shipments across suppliers within the same state by executing a route across these suppliers and finding the optimal order frequency and safety lead time for the consolidated set of shipments;
reducing the supplier base by assuming that all suppliers in a given state can be consolidated to the location in the state closest to the manufacturing plant and finding the optimal order frequency and safety lead time for the consolidated set of shipments; and reducing the supplier base by assuming that all suppliers in a given state can be consolidated to the location in the state closest to the manufacturing plant, moving suppliers closer to the manufacturing plant and finding the optimal order frequency and safety lead time for the consolidated set of shipments.

15. The system according to claim 12, wherein the quantifying includes:

calculating an origin to destination air distance using latitude and longitudinal data; and calculating an origin to destination road distance by adjusting the origin to destination air distance by a road distance correction factor.

16. The system according to claim 12, wherein:

said first component is the transportation cost is modeled as the sum of a fixed cost component, which depends on the fixed cost per shipment and the order frequency (a.n), and a variable cost component that depends on the variable cost per mile-ton transported and the total mile tons transported (b.w.m.D);

said second component is the inventory carrying charge, the average inventory level at the plant is the sum of the work-in-process inventory and the safety stock inventory. The work-in-process inventory, given by $$\left(\frac{D}{2n}\right),$$

depends on demand and order frequency;

the safety stock inventory captures the additional inventory in the plant due to the expected amount of time by which each part is early, this safety stock, given by $(E(s-T)^+D)$, depends on demand, safety lead time, delivery delay distribution;

the inventory carrying charge is modeled as the product of the average inventory level and the unit carrying charge (hC);

said third component is a carbon cost, defined as the product of the carbon price per mile-ton transported and the total mile-tons transported ($\psi$.w.m.D);

the carbon price per mile-ton transported is obtained as the product of the carbon emission factor and the carbon price per ton of emission;

the minimizing the cost and carbon impact includes minimizing $$\left(\frac{D}{2n} + E(s-T)^+D\right).h.C + a.n + b.w.m.D + \psi.w.m.D$$

subject to a service constraint;

said service constraint is a manufacturing availability target constraint given by:

$$n\left[E\left(\frac{1}{n}+s-T\right)^+ - E(s-T)^+\right] \geq \alpha$$

Where

D=Constant demand rate of a given part
T=Random variable representing supply delay
$\alpha$=Target inventory availability to manufacturing h=Annual inventory carrying rate (in %)
C=Unit cost (in $)
w=Unit weight (in tons)
m=Distance of supplier from manufacturing plant (in miles)
a=Fixed transportation cost parameter (in $ per shipment)
b=Variable transportation cost parameter (in $ per mile-ton)
$\psi$=Carbon cost (in $ per mile-ton)
s=Safety lead time associated with the orders to help meet target inventory availability
n=Stationary order frequency given by $$\left(\frac{D}{Q}\right)$$

E(.)=Expected value function
$(x-y)^+$=Maximum of (x-y) and zero.

17. An article of manufacture comprising:

at least one tangible, non-transitory computer usable medium having computer readable program code logic tangibly embodied therein to execute a machine instruction in a processing unit for carbon management for sourcing and logistics, said computer readable program code logic, when executing, performing the following steps:

quantifying both a cost and a carbon impact of one or more logistics policies relating to a manufacturing process in which specified product components are shipped from suppliers to an assembly plant; and minimizing said cost and carbon impact using a defined optimization equation to determine a combination of a multitude of components relating to the shipment of the product components from the suppliers to the assembly plant, said multitude of components including a first component representing a transportation cost for shipping product components from suppliers to an assembly plant, a second component representing an inventory cost and a third component representing a carbon cost for carbon emissions from inbound transportation activities of the shipping the product components from the suppliers to the assembly plant, said third component including a carbon price per mile-ton transported for transporting the product components from the suppliers to the assembly plant, said carbon price per mile-ton transported being based on a specified carbon emission factor and a specified carbon price per ton of emission; and wherein:

the using the defined optimization equation includes using the defined optimization equation to obtain a specified order frequency for ordering parts from the suppliers.

18. The article of manufacture according to claim 17, wherein the quantifying is done by using an analytics engine to quantify said cost and carbon impact, said analytics engine including:

a shipment analysis module to compute carbon emissions from inbound transportation activities of shipping the product components from the suppliers to the assembly plant;

a sourcing analysis module for testing alternate sourcing options;

a scenario analysis module to find an optimal order frequency for each part that minimizes the total cost subject to a service constraint and decides on the best transportation mode for a given order consolidation policy; and
sensitivity analysis module to test the impact of changes to uncontrollable or uncertain input parameters.

19. The article of manufacture according claim 18, wherein the said consolidation policy is selected from the group comprising:
   using planned order frequencies for shipments finding the optimal order frequency and safety lead time for every individual shipment;
   consolidating all shipments that are sourced from the same supplier and finding the optimal order frequency and safety lead time for the consolidated set of shipments;
   consolidating shipments that are sourced within a defined geographical area bound for a destination that is defined within a determined geographical area;
   consolidating shipments across suppliers within the same state by executing a route across these suppliers and finding the optimal order frequency and safety lead time for the consolidated set of shipments;
   reducing the supplier base by assuming that all suppliers in a given state can be consolidated to the location in the state closest to the manufacturing plant and finding the optimal order frequency and safety lead time for the consolidated set of shipments; and
   reducing the supplier base by assuming that all suppliers in a given state can be consolidated to the location in the state closest to the manufacturing plant, moving suppliers closer to the manufacturing plant and finding the optimal order frequency and safety lead time for the consolidated set of shipments.

20. The article of manufacture according to claim 17, wherein:
   said first component is the transportation cost is modeled as the sum of a fixed cost component, which depends on the fixed cost per shipment and the order frequency (a.n), and a variable cost component that depends on the variable cost per mile-ton transported and the total mile tons transported (b.w.m.D);
   said second component is the inventory carrying charge, the average inventory level at the plant is the sum of the work-in-process inventory and the safety stock inventory, the work-in-process inventory, given by $$\left(\frac{D}{2n}\right),$$

depends on demand and order frequency;
   the safety stock inventory captures the additional inventory in the plant due to the expected amount of time by which each part is early, this safety stock, given by $(E(s-T)^+D)$, depends on demand, safety lead time, delivery delay distribution;
   the inventory carrying charge is modeled as the product of the average inventory level and the unit carrying charge (hC);
   said third component is a carbon cost, defined as the product of the carbon price per mile-ton transported and the total mile-tons transported ($\psi$.w.m.D);
   the carbon price per mile-ton transported is obtained as the product of the carbon emission factor and the carbon price per ton of emission;
   the minimizing the cost and carbon impact includes minimizing $$\left(\frac{D}{2n} + E(s-T)^+D\right).h.C + a.n + b.w.m.D + \psi.w.m.D$$

subject to a service constraint;
said service constraint is a manufacturing availability target constraint given by:

$$n\left[E\left(\frac{1}{n} + s - T\right)^+ - E(s-T)^+\right] \geq \alpha$$

Where
   D=Constant demand rate of a given part
   T=Random variable representing supply delay (i.e. time by which an order is late)
   $\alpha$=Target inventory availability to manufacturing
   h=Annual inventory carrying rate (in %)
   C=Unit cost (in $)
   w=Unit weight (in tons)
   m=Distance of supplier from manufacturing plant (in miles)
   a=Fixed transportation cost parameter (in $ per shipment)
   b=Variable transportation cost parameter (in $ per mile-ton)
   $\psi$=Carbon cost (in $ per mile-ton)
   s=Safety lead time associated with the orders to help meet target inventory availability
   n=Stationary order frequency given by $$\left(\frac{D}{Q}\right)$$

E(.)=Expected value function
   $(x-y)^+$=Maximum of $(x-y)$ and zero.

21. A method of carbon management for sourcing and logistics, comprising:
   quantifying, by a computer, a cost and a carbon impact of a plurality of logistics policies relating to a manufacturing process by using an analytics engine operating on the computer to quantify said cost and carbon impact; and
   minimizing, by a computer, said cost and carbon impact using a defined equation including a first component representing a transportation cost, a second component representing an inventory cost, and a third component representing a carbon cost;
   wherein the analytics engine includes a shipment analysis module to calculate an optimal transportation policy by minimizing logistic costs, and a sourcing analysis module for testing alternate sourcing options; and wherein:
   the using the defined equation includes using the defined equation to obtain a specified order frequency for ordering parts from the suppliers.

22. The method according to claim 21, wherein the analytics engine further includes a scenario analysis module to find an optimal order frequency fore each part of a multitude of parts that minimizes the total cost subject to a service constraint, and decides on a best transportation mode for a given order consolidation policy, said order consolidation policy being selected from the group comprising:
   using planned order frequencies for parts without any additional consolidation effort;

finding the optimal order frequency and safety lead time for every individual part;

consolidating all parts that are sourced from the same supplier and finding the optimal order frequency and safety lead time for the consolidated set of parts;

consolidating parts across suppliers within the same state by executing a milk-run across these suppliers and finding the optimal order frequency and safety lead time for the consolidated set of parts;

reducing the supplier base by assuming that all suppliers in a given state can be consolidated to the location in the state closest to the manufacturing plant and finding the optimal order frequency and safety lead time for the consolidated set of parts; and reducing the supplier base by assuming that all suppliers in a given state can be consolidated to the location in the state closest to the manufacturing plant, moving suppliers closer to the manufacturing plant and finding the optimal order frequency and safety lead time for the consolidated set of parts.

23. The method according to claim 21, wherein the analytics engine further includes a sensitivity analysis module to test the impact of changes to uncontrollable or uncertain input parameters.

24. The method according to claim 23, wherein the quantifying includes using a regression model for transportation cost calculation by mode of transportation.

25. The method according to claim 21, wherein:

said first component is modeled as the sum of a fixed cost component, which depends on the fixed cost per shipment and the order frequency (a.n), and a variable cost component that depends on the variable cost per mile-ton transported and the total mile tons transported (b.w.m.D);

said second component is the inventory carrying charge, wherein the average inventory level at the plant is the sum of the work-in-process inventory and the safety stock inventory; the work-in-process inventory, given by $$\left(\frac{D}{2n}\right),$$

depends on demand and order frequency; and said third component is defined as the product of the carbon price per mile-ton transported and the total mile-tons transported ($\psi$.w.m.D); the carbon price per mile-ton transported is obtained as the product of the carbon emission factor and the carbon price per ton of emission;

the minimizing the cost and carbon impact includes minimizing $$\left(\frac{D}{2n} + E(s-T)^+ D\right).h.C + a.n + b.w.m.D + \psi.w.m.D$$

where
D=Constant demand rate of a given part
T=Random variable representing supply delay
h=Annual inventory carrying rate (in %)
C=Unit cost (in $)
w=Unit weight (in tons)
m=Distance of supplier from manufacturing plant (in miles)
a=Fixed transportation cost parameter (in $ per shipment)
b=Variable transportation cost parameter (in $ per mile-ton)
$\psi$=Carbon cost (in $ per mile-ton)
s=Safety lead time associated with the orders to help meet target inventory availability
n=Stationary order frequency given by $$\left(\frac{D}{Q}\right)$$

E(.)=Expected value function.

* * * * *